United States Patent
Burgess et al.

(10) Patent No.: US 11,236,787 B2
(45) Date of Patent: Feb. 1, 2022

(54) TORQUE ASSEMBLY AND METHOD OF MAKING AND USING THE SAME

(71) Applicant: SAINT-GOBAIN PERFORMANCE PLASTICS RENCOL LIMITED, Coventry (GB)

(72) Inventors: James K. Burgess, Bristol (GB); Brandon S. Murphy, West Milford, NJ (US)

(73) Assignee: SAINT-GOBAIN PERFORMANCE PLASTICS RENCOL LIMITED, Loughborough (GB)

( * ) Notice: Subject to any disclaimer, the term of this patent is extended or adjusted under 35 U.S.C. 154(b) by 110 days.

(21) Appl. No.: 16/503,686

(22) Filed: Jul. 5, 2019

(65) Prior Publication Data

US 2020/0018363 A1    Jan. 16, 2020

Related U.S. Application Data

(60) Provisional application No. 62/696,060, filed on Jul. 10, 2018.

(51) Int. Cl.
| | | |
|---|---|---|
| *F16D 43/21* | (2006.01) | |
| *E05D 11/08* | (2006.01) | |
| *E05D 11/10* | (2006.01) | |

(52) U.S. Cl.
CPC .......... *F16D 43/211* (2013.01); *E05D 11/082* (2013.01); *E05D 11/10* (2013.01)

(58) Field of Classification Search
CPC ...... F16D 43/211; F16D 41/088; F16D 41/20; E05D 11/082; E05D 11/10

See application file for complete search history.

(56) References Cited

U.S. PATENT DOCUMENTS 2,868,001 A * 1/1959 Russell ..................... F16D 7/02
464/30
3,976,340 A * 8/1976 Pitner ................... F16C 19/466
384/581

(Continued)

FOREIGN PATENT DOCUMENTS

| EP | 3091243 A1 | 11/2016 |
| EP | 3147526 A1 | 3/2017 |

(Continued)

OTHER PUBLICATIONS

International Search Report and Written Opinion for PCT/EP2019/068068, dated Feb. 28, 2020, 12 pages.

*Primary Examiner* — David J Hlavka
(74) *Attorney, Agent, or Firm* — Abel Schillinger, LLP; Chi Suk Kim

(57) ABSTRACT

A torque assembly including an inner member; an outer member; a first torque member disposed between the inner member and the outer member; and a second torque member disposed radially exterior or interior to the first torque member; where upon rotation in a first circumferential direction, the first torque member is allowed to generally freely rotate and in a second circumferential direction, the first torque member is radially shifted to impede or prevent rotation, and where the second torque member provides a circumferential slip interface between the inner member and the outer member to allow rotation in the second circumferential direction.

14 Claims, 7 Drawing Sheets

(56) References Cited

U.S. PATENT DOCUMENTS

| | | | |
|---|---|---|---|
| 4,184,576 A | 1/1980 | Kulischenko et al. | |
| 4,836,606 A | 6/1989 | Werner | |
| 5,871,414 A | 2/1999 | Voss et al. | |
| 6,480,363 B1* | 11/2002 | Prater | F16C 27/04 360/265.7 |
| 6,619,743 B1 | 9/2003 | Scholz et al. | |
| 6,755,470 B2 | 6/2004 | Iwata et al. | |
| 7,563,186 B2 | 7/2009 | Mercat et al. | |
| 8,517,470 B2 | 8/2013 | Roth et al. | |
| 8,915,548 B2 | 12/2014 | Stilleke et al. | |
| 10,001,178 B2* | 6/2018 | Iwano | F16D 41/066 |
| 10,371,213 B2 | 8/2019 | Slayne et al. | |
| 2006/0230574 A1 | 10/2006 | Murayama et al. | |
| 2009/0238504 A1* | 9/2009 | Suzuki | F16C 17/02 384/29 |
| 2010/0072017 A1* | 3/2010 | Joki | F16D 41/088 192/44 |
| 2010/0181160 A1* | 7/2010 | Suzuki | F16D 41/07 192/41 A |
| 2011/0076096 A1* | 3/2011 | Slayne | F16C 27/02 403/372 |
| 2014/0096342 A1 | 4/2014 | Kim | |
| 2014/0361594 A1 | 12/2014 | Thiel | |
| 2016/0001679 A1 | 1/2016 | Thiel | |
| 2016/0001680 A1 | 1/2016 | Thiel | |
| 2017/0059002 A1 | 3/2017 | Sasaki | |
| 2018/0128026 A1 | 5/2018 | Burgess et al. | |
| 2018/0306248 A1 | 10/2018 | Itta et al. | |

FOREIGN PATENT DOCUMENTS

| | | |
|---|---|---|
| WO | 2018192914 A1 | 10/2018 |
| WO | 2020011659 A2 | 1/2020 |

\* cited by examiner

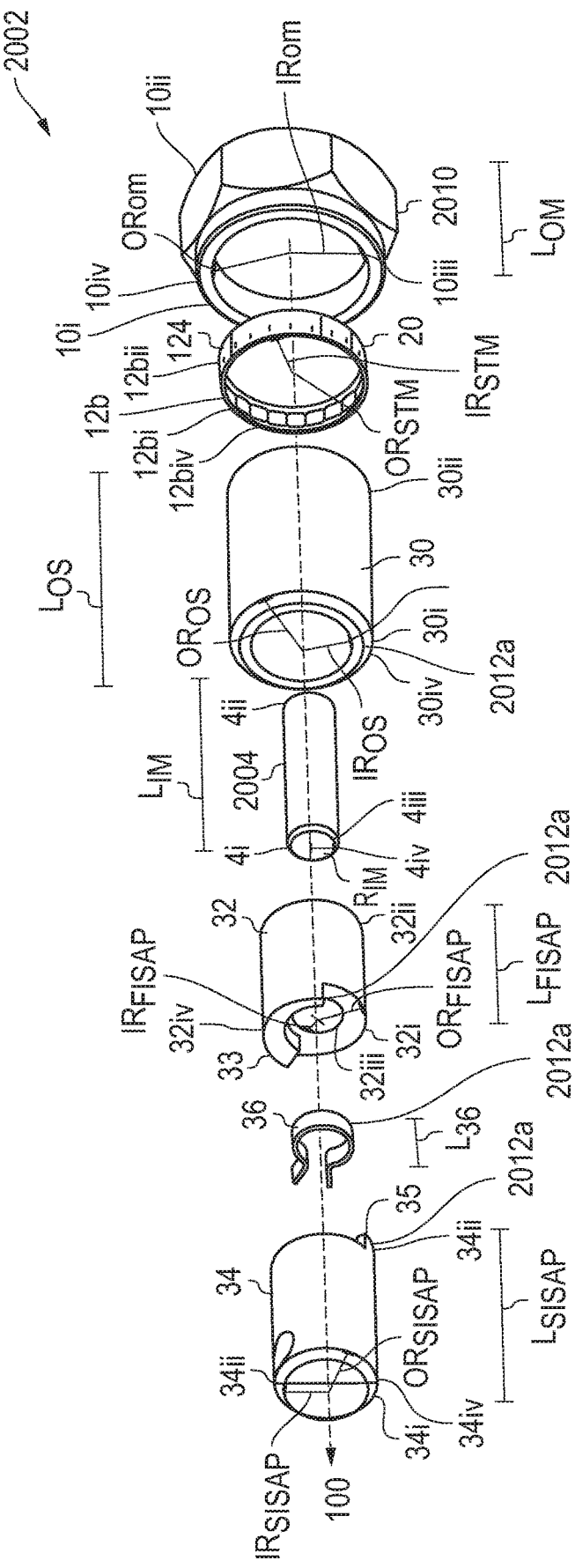
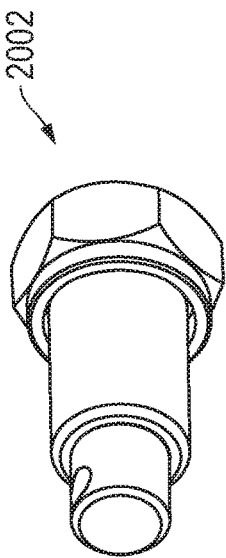
FIG. 2A
FIG. 2B

TORQUE ASSEMBLY AND METHOD OF MAKING AND USING THE SAME

CROSS-REFERENCE TO RELATED APPLICATION(S)

This application claims priority under 35 U.S.C. § 119(e) to U.S. Patent Application No. 62/696,060 entitled "TORQUE ASSEMBLY AND METHOD OF MAKING AND USING THE SAME," by James K. BURGESS et al., filed Jul. 10, 2018, which is assigned to the current assignee hereof and incorporated herein by reference in its entirety.

FIELD OF THE DISCLOSURE

This disclosure relates to an apparatus comprising a torque assembly, and more particularly, a torque assembly that includes a torque member including a bearing or a tolerance ring.

BACKGROUND

A torque assembly can be used to prevent, stop, or retard the movement of a movable body. Conventionally, torque assemblies may allow for rotation of an inner member within an outer member or vice versa. In some cases, torque assembles can be used to allow easier movement in one circumferential direction while impeding movement (or requiring high rotational torque) in the other circumferential direction. These torque assemblies can include hinges, door closing mechanisms, seat components, or another movable body often used in vehicles. A torque assembly can also be used to bias movement or retain a door, seat component, or other movable body in a certain position.

Problems can occur in torque assemblies due to overload situations, larger size and complexity of assembly, varying torque over a lifetime due to wear or abrasion of the components of the assembly, or performance of the torque assembly components being dependent on temperature or other conditions. These all can increase cost of components, operation, and assembly of the torque assembly. Therefore, there exists a need for improved torque assemblies in various applications.

BRIEF DESCRIPTION OF THE DRAWINGS

The present disclosure may be better understood, and its numerous features and advantages made apparent to those skilled in the art by referencing the accompanying drawings.

FIG. 2A is an exploded view of a torque assembly according to at least one embodiment of the invention;

FIG. 2B is an perspective side view of a torque assembly according to at least one embodiment of the invention;

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the torque assembly, tolerance ring, and bearing arts.

Figure 1A:
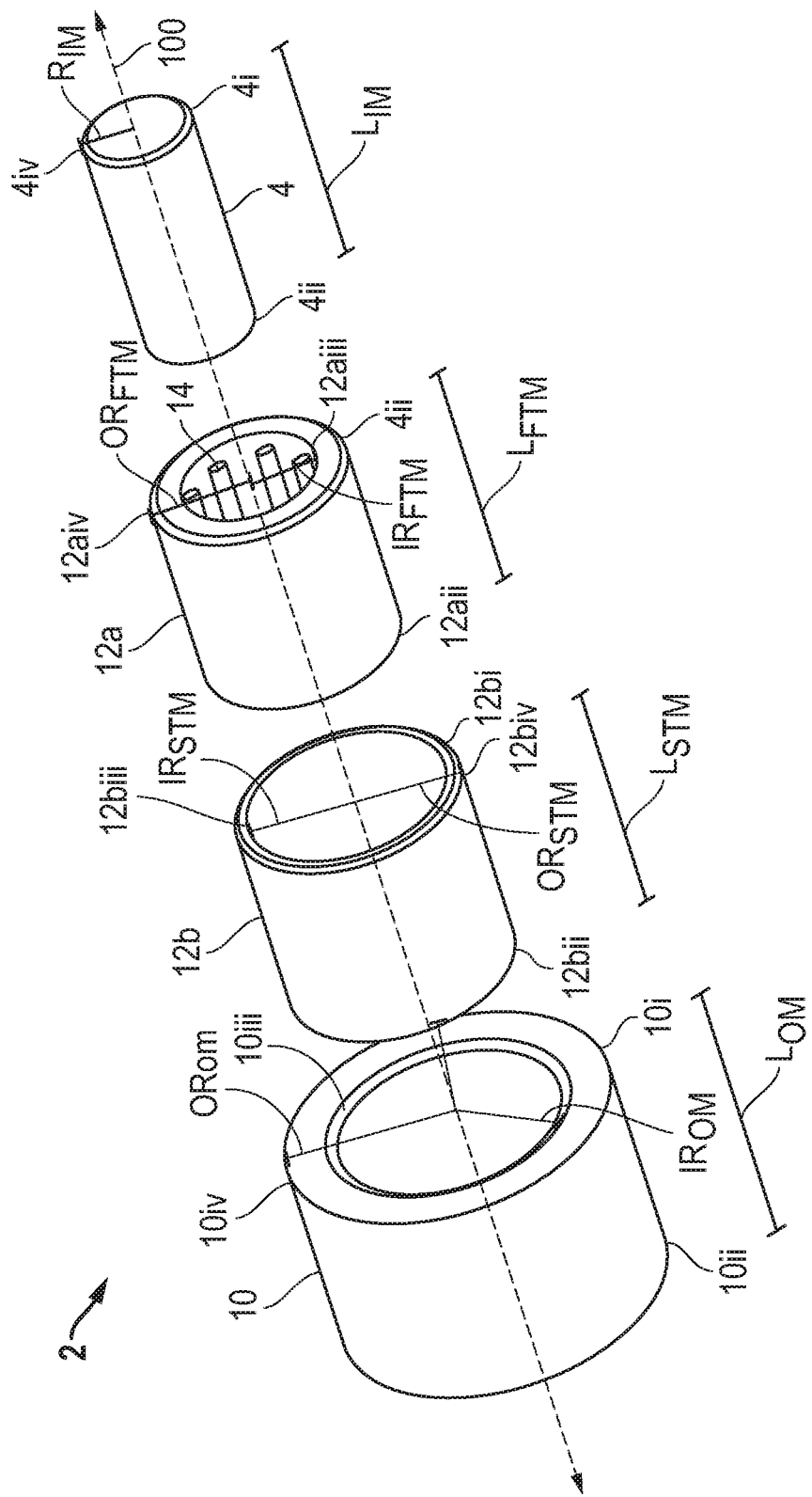
FIG. 1A is a cross-sectional view of a torque assembly according to at least one embodiment of the invention.

Referring initially to FIG. 1A, a torque assembly 2 is shown according to an embodiment. The torque assembly 2 may include an inner member 4 that extends along a longitudinal direction of the torque assembly 2. The inner member 4 may include a shaft, bolt, or similar component positioned along a central axis 100 that extends along a longitudinal direction of the torque assembly 2. The inner member 4 may have a first axial end 4*i* and a second axial end 4*ii* positioned along a central axis 100 that extends along a longitudinal direction of the torque assembly 2. As shown in exemplary FIG. 1A, the inner member 4 may have a radial end 10*iv*. The inner member 4 may have a radius $R_{IM}$, from the central axis 100 to the outer radial end 4*iv*. The inner member 4 can have a length $L_{IM}$ from first axial end 4*i* to the second axial end 4*ii*. The torque assembly 2 can further include an outer member 10 including a housing or similar component positioned along a central axis 100 that extends along a longitudinal direction of the torque assembly 2. The inner member 4 may be disposed within or at least partially surrounded by the outer member 10. The outer member 10 may have a first axial end 10*i* and a second axial end 10*ii*. As shown in exemplary FIG. 1A, the outer member 10 may have an inner radial end 10*iii* and an outer radial end 10*iv*. The outer member 10 may have an inner radius $IR_{OM}$, from the central axis 100 to the inner radial end 10*iii*. The outer member 10 may have an outer radius $OR_{OM}$, from the central axis 100 to the outer radial end 10*iv*. The outer member 10 may have a length $L_{OM}$ from the first axial end 10*i* to the second axial end 10*ii*. In at least one embodiment, the torque assembly 2 can include at least one torque member or similar component 12. In at least one embodiment, the torque assembly 2 can include a first torque member 12*a* and a second torque member 12*b*. At least one of the first torque member 12*a* or the second torque member 12*b* may be disposed between the inner member 4 and the outer member 10. The first torque member 12*a* may be at least partially radially interior the second torque member 12*b*. Alternatively, the first torque member 12*a* may be at least partially radially exterior the second torque member 12*b*.

In an embodiment, as shown in FIG. 1A, the first torque member 12*a* may be a bearing. The first torque member 12*a* may be a one-way bearing. The first torque member 12*a* may be a needle bearing including a plurality of rolling elements 14 adapted to rotate in either the first circumferential direction or the second circumferential direction. The needle bearing may further include a locking component 16 adapted to impede or prevent the plurality of rolling elements from rotating in at least one of the first circumferential direction or second circumferential direction, thus impeding or preventing the first torque member 12*a* from rotating in at least one of the first circumferential direction or second circumferential direction. In an embodiment, the first circumferential direction may be clockwise while the second circumferential direction may be counter-clockwise. Alternatively, in another embodiment, the first circumferential direction may be counter-clockwise while the second circumferential direction may be clockwise. The first torque member 12*a* may have a first axial end 12*ai* and a second axial end 12*aii*. The first torque member 12*a* may have an inner radial end 12*aiii* and an outer radial end 12*aiv*. The first torque member 12*a* may have an inner radius $IR_C$, from the central axis 100 to the inner radial end 12*aiii*. The first torque member 12*a* may have an outer radius $OR_C$, from the central axis 100 to the outer radial end 12*aiv*. The first torque member 12*a* may have a length $L_{FTM}$ from the first axial end 12*ai* to the second axial end 12*aii*.

Still referring to FIG. 1A, the second torque member 12*b* may be radially exterior to the first torque member 12*a*. The second torque member 12*b* may be a bearing or a tolerance ring. The second torque member 12*b* may have a first axial end 12*bi* and a second axial end 12*bii*. The second torque member 12*b* may have an inner radial end 12*biii* and an outer radial end 12*biv*. The second torque member 12*b* may have an inner radius $IR_C$, from the central axis 100 to the inner radial end 12*biii*. The second torque member 12*b* may have an outer radius $OR_C$, from the central axis 100 to the outer radial end 12*biv*. The second torque member 12*b* may have a length $L_{STM}$ from the first axial end 12*bi* to the second axial end 12*bii*.

Figure 1B:
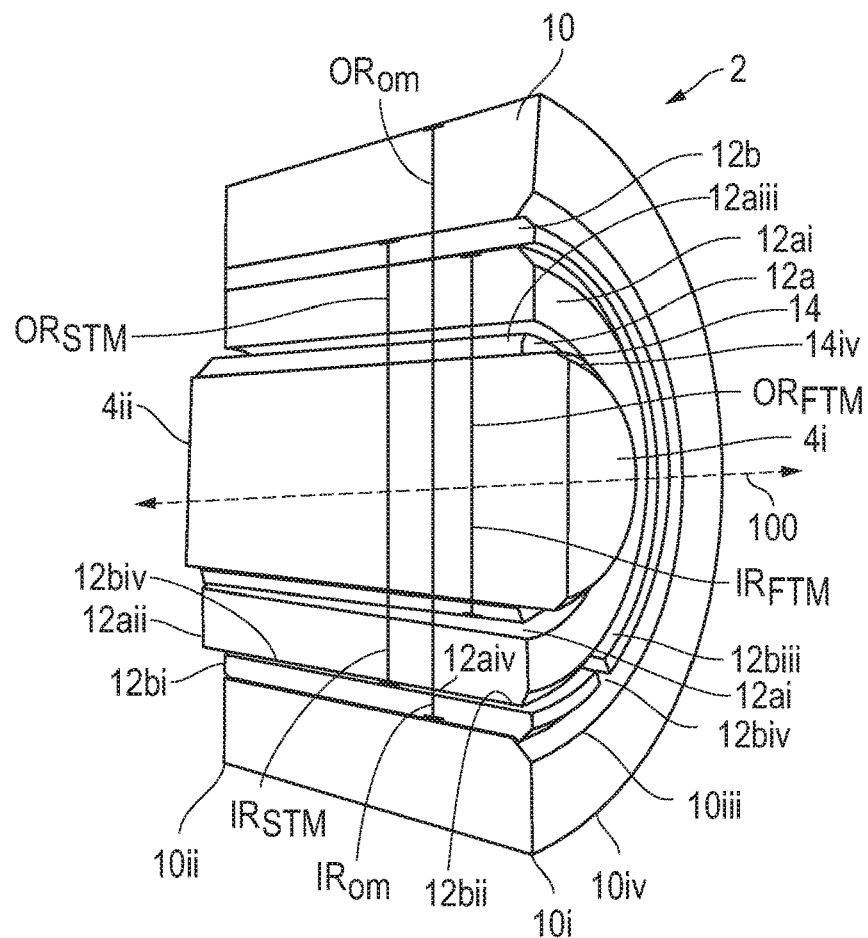
FIG. 1B is a cross-sectional view of a torque assembly according to at least one embodiment of the invention.

In an embodiment of the torque assembly 2, as shown in FIGS. 1A-1B, the length and radius of the outer member 10 can be sized to fit around the second torque member 12*b* to provide an interference fit therebetween. The length and radius of the second torque member 12*b* can be sized to fit around the first torque member 12*a* to provide an interference fit therebetween. The length and radius of the first torque member 12*a* can be sized to fit around the inner member 4 to provide an interference fit therebetween to form the assembly 2. When a first circumferential directional torque may be applied, the inner member 4 may freely spin in the first torque member 12*a* because friction between the inner member 4 and the first torque member 12*a* may be less than the friction between the first torque member 12*a* and the second torque member 12*b*. When a second circumferential directional torque may be applied, the inner member 4 may be impeded or locked via the needles 14 shifting radially, and the inner member 4 can only rotate in the slip interface provided between the first torque member 12*a* and the second torque member 12*b* after torque applied exceeds the frictional forces of the second torque member 12*b* within the outer member 10. In this way, a first torque member 12*a* having a bearing disposed between the inner member 4 and the outer member 10, and a second torque member 12*b* may be provided where upon rotation in a first circumferential direction, the first torque member 12*a* may be allowed to generally freely rotate and in a second circumferential direction, the first torque member 12*a* may be radially shifted to impede or prevent rotation, and wherein the second torque member 12*b* provides a circumferential slip interface between the inner member 4 and the outer member 10 to allow rotation in the second circumferential direction.

Figure 1C:
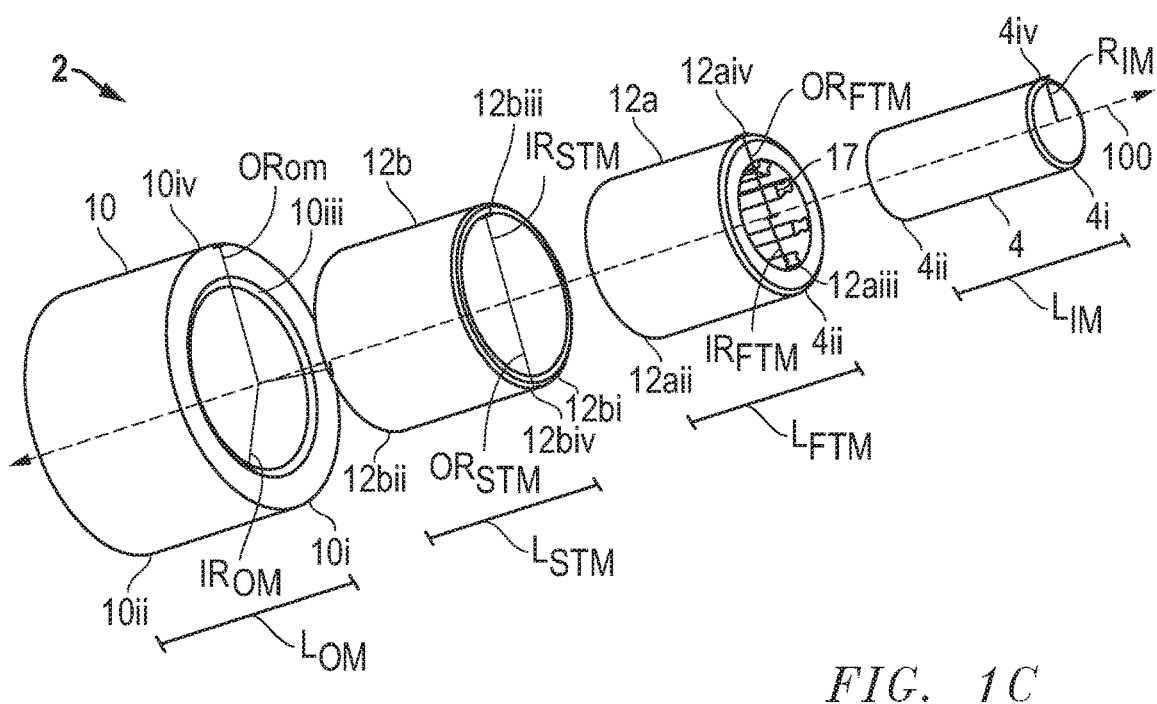
FIG. 1C is an exploded view of a torque assembly according to at least one embodiment of the invention.

Referring to a similar embodiment, as shown in FIG. 1C, a torque assembly 2 is shown. The torque assembly 2 may include an inner member 4 that extends along a longitudinal direction of the torque assembly 2. The torque assembly 2 can further include an outer member 10 including a housing or similar component positioned along a central axis 100 that extends along a longitudinal direction of the torque assembly 2. In at least one embodiment, the torque assembly 2 can include at least one torque member or similar component 12. In at least one embodiment, the torque assembly 2 can include a first torque member 12*a* and a second torque member 12*b*. The first torque member 12*a* may be at least partially radially interior the second torque member 12*b*.

The first torque member 12*a* may be a one-way bearing. The first torque member 12*a* may be a one-way bearing. As shown in FIG. 1C the first torque member 12*a* may be a sprag bearing including a plurality of sprags 14' adapted to allow rotation of the bearing in either the first circumferential direction or the second circumferential direction. The sprag bearing may further include a locking component 16 adapted to impede or prevent the plurality of sprags from allowing rotation in at least one of the first circumferential direction or second circumferential direction, thus impeding or preventing the first torque member 12*a* from rotating in at least one of the first circumferential direction or second circumferential direction. The second torque member 12*b* may be radially exterior to the first torque member 12*a*. The second torque member 12*b* may be a bearing or a tolerance ring.

In an alternative embodiment of the torque assembly 2, as shown in FIG. 1C, the length and radius of the outer member 10 can be sized to fit around the second torque member 12b to provide an interference fit therebetween. The length and radius of the second torque member 12b can be sized to fit around the first torque member 12a to provide an interference fit therebetween. The length and radius of the first torque member 12a can be sized to fit around the inner member 4 to provide an interference fit therebetween to form the assembly 2. When a first circumferential directional torque may be applied, the inner member 4 may freely spin in the first torque member 12a because friction between the inner member 4 and the first torque member 12a may be less than the friction between the first torque member 12a and the second torque member 12b. When a second circumferential directional torque may be applied, the inner member 4 may be impeded or locked via the sprags 14' shifting radially, and the inner member 4 can only rotate in the slip interface provided between the first torque member 12a and the second torque member 12b after torque applied exceeds the frictional forces of the second torque member 12b within the outer member 10. In this way, a first torque member 12a having a bearing disposed between the inner member 4 and the outer member 10, and a second torque member 12b may be provided where upon rotation in a first circumferential direction, the first torque member 12a may be allowed to generally freely rotate and in a second circumferential direction, the first torque member 12a may be radially shifted to impede or prevent rotation, and wherein the second torque member 12b provides a circumferential slip interface between the inner member 4 and the outer member 10 to allow rotation in the second circumferential direction.

In an alternative embodiment, as shown in FIGS. 2A-2B, a torque assembly 2002 is shown. The torque assembly 2002 may include an inner member 4 that extends along a longitudinal direction of the torque assembly 2002. The torque assembly 2002 can further include an outer member 10 including a housing or similar component positioned along a central axis 100 that extends along a longitudinal direction of the torque assembly 2002. In at least one embodiment, the torque assembly 2002 can include at least one torque member or similar component 12. In at least one embodiment, the torque assembly 2002 can include a first torque member 2012a and a second torque member 2012b.

The first torque member 2012a may include a plurality of adjacent shafts. The first torque member 2012a can include an outer shaft 30, a first inner shaft axial piece 32, a second inner shaft axial piece 34, and a spring component 36. The outer shaft 30 may be disposed radially exterior to at least one of the first inner shaft axial piece 32, the second inner shaft axial piece 34, or the spring component 36. The spring component 36 may include a spring collar and may be disposed between the first inner shaft axial piece 32 and the second inner shaft axial piece 34 in the axial direction and be adapted to shift at least one of the first inner shaft axial piece 32, the second inner shaft axial piece 34, or the outer shaft 30 the radial direction. Such a shift may impede or prevent the first torque member 2012a from rotating in at least one of the first circumferential direction or second circumferential direction. The first inner shaft axial piece 32 and the second inner shaft axial piece 34 may each have a coupling flange 33, 35 respectively directed in the radial direction. These coupling flanges 33, 35 may be adapted to form a coupling between the first inner shaft axial piece 32 and the second inner shaft axial piece 34. They may form a coupling between the first inner shaft axial piece 32 and the second inner shaft axial piece 34 around the spring component 36. The second torque member 2012b may be a bearing or a tolerance ring. The first torque member 12a may be radially interior to the second torque member 12b.

In an embodiment of the torque assembly 2002, as shown in FIGS. 2A-2B, the length and radius of the outer member 2010 can be sized to fit around the second torque member 2012b to provide an interference fit therebetween. The length and radius of the second torque member 2012b can be sized to fit around an outer shaft 30 to provide an interference fit therebetween. The length, $L_{OS}$, and radius of the outer shaft 30 can be sized to fit around at least one of a first inner shaft axial piece 32 or a second inner shaft axial piece 34 to provide an interference fit therebetween. The length and radius of at least one of the first inner shaft axial piece 32 ($L_{FISAP}$, $R_{FISAP}$) or the second inner shaft axial piece 34 ($L_{SISAP}$, $R_{SISAP}$) can be sized to fit around the inner member 2004 to provide an interference fit therebetween to form the assembly 2002. When a first circumferential directional torque may be applied, the inner member 2004 may freely spin in the first torque member 2012a because friction between the inner member 2004 and the first torque member 2012a may be less than the friction between the first torque member 2012a and the second torque member 2012b because the spring component 36 keeps the first inner shaft axial piece 32 and the second inner shaft axial piece 34 as the coupling flanges 33, 35 may be paired together within the outer shaft 30, allowing concentricity of the assembly 2002. In other words, when the coupling flanges 33, 35 contact, the first inner shaft axial piece 32 and the second inner shaft axial piece 34 may be aligned such that together they form a generally cylindrical outer surface that allows rotation of the outer shaft 30 and the inner member 2004, relative to the first inner shaft axial piece 32 and the second inner shaft axial piece 34 and the housing 2010. When a second circumferential directional torque may be applied, the inner member 2004 may be impeded or locked because the spring component 36 acts with the first inner shaft axial piece 32 and the second inner shaft axial piece 34 to move components of the first torque member 2012a out of alignment or concentricity radially, and consequently impedes or prevents rotation, and the inner member 2004 can only rotate in the slip interface provided between the outer shaft 130 and the second torque member 2012b after torque applied exceeds the frictional forces of the second torque member 2012b within the outer member 2010. In this way, a first torque member 2012a having plurality of adjacent shafts 30, 32, 34 disposed between the inner member 2004 and the outer member 2010, and a second torque member 2012b may be provided where upon rotation in a first circumferential direction, the first torque member 2012a may be allowed to generally freely rotate and in a second circumferential direction, the first torque member 2012a may be radially shifted to impede or prevent rotation, and wherein the second torque member 2012b provides a circumferential slip interface between the inner member 2004 and the outer member 2010 to allow rotation in the second circumferential direction.

Figure 3:
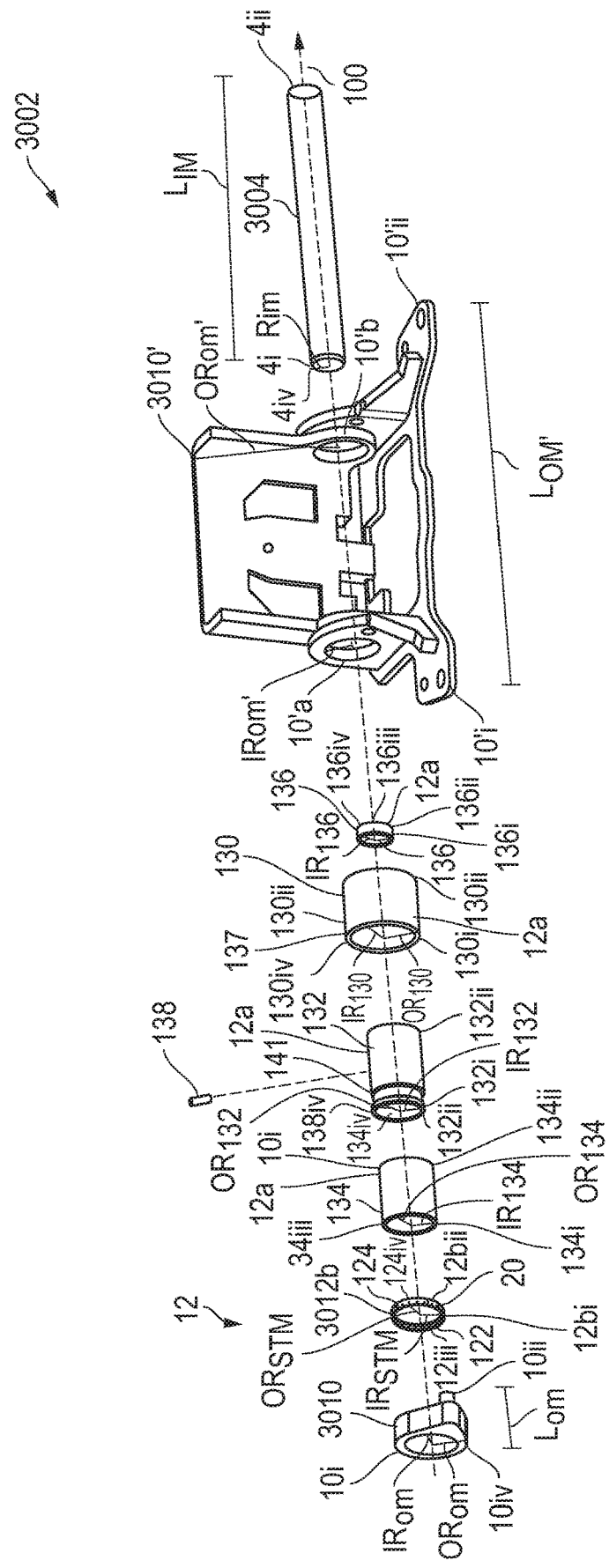
FIG. 3 is an exploded view of a torque assembly according to at least one embodiment of the invention.

In an alternative embodiment, as shown in FIG. 3, a torque assembly 3002 is shown. The torque assembly 3002 may include an inner member 3004 that extends along a longitudinal direction of the torque assembly 3002. The torque assembly 3002 can further include a fixed outer member or housing 3010 including a housing or similar component positioned along a central axis 100 that extends along a longitudinal direction of the torque assembly 3002. The outer member 3010 may include a modified outer member in the form of a hinged outer member or housing 3010' positioned along a central axis 100 that extends along a longitudinal direction of the torque assembly 3002. The modified outer member 3010' may have a first axial end 10'*i* and a second axial end 10'*ii*. The modified outer member 3010' may have an inner radial end 10'*iii* and an outer radial end 10'*iv*. The modified outer member 3010' may have an inner radius $IR_{OM'}$ from the central axis 100 to the inner radial end 10'*iii*. The modified outer member 3010' may have an outer radius $OR_{OM'}$ from the central axis 100 to the outer radial end 10'*iv*. The modified outer member 3010' may have a length $L_{OM'}$ from the first axial end 10'*i* to the second axial end 10'*ii*. The modified outer member 3010' may have a first aperture end 10'*a* and a second aperture end 10'*b*. In at least one embodiment, the torque assembly 3002 can include at least one torque member or similar component 12. In at least one embodiment, the torque assembly 3002 can include a first torque member 12*a* and a second torque member 12*b*.

The first torque member 12*a* may include a plurality of adjacent shafts. The first torque member 3012*a* can include an outer shaft 130 (which may include control collar 130), a first inner shaft axial piece which may include a shaft 132, a second inner shaft axial piece 134 which may include a tolerance ring or bearing, and a spring component 136. In this embodiment, the spring component 136 may be a tolerance ring 20 or bearing. The spring component 136 may be disposed between the inner member 4 and the first inner shaft axial piece 132 in the radial direction and be adapted to shift at least one of the first inner shaft axial piece 132, the second inner shaft axial piece 134, or the outer shaft 130 in the radial direction. Such a shift may impede or prevent the first torque member 3012*a* from rotating in at least one of the first circumferential direction or second circumferential direction. The spring component 136 may be axially exterior to the inner member 3004 and axially interior to all the other components of the first torque member 3012*a*. A pin 138 may be used to hold the axial position of the outer shaft 130 relative to at least one of the first inner shaft axial piece 132 or the second inner shaft axial piece 134. The pin 138 may sit within a radial groove 137 in the outer shaft 130. The second torque member 3012*b* may be a bearing or a tolerance ring. The first torque member 12*a* may be radially interior to the second torque member 12*b*.

In an embodiment of a torque assembly 3002, as shown in FIG. 3, the length and radius of the hinged outer member 3010' can be sized to fit around the outer shaft or control collar 130 to the interior of a first aperture end 10'*a* of the hinged outer member 3010'. The length and radius of the outer shaft 130 ($L_{OS}$, $R_{OS}$) can be sized to fit around the second inner shaft axial piece 134 to provide an interference fit therebetween. The length and radius of second inner shaft axial piece 134 ($L_{SISAP}$, $R_{SISAP}$) can be sized to fit around the first inner shaft axial piece 132 to provide an interference fit therebetween. The first inner shaft axial piece 132 may protrude through the first aperture end 3010'*a* of the hinged outer member 3010'. The second torque member 12*b* may fit between the first inner shaft axial piece 132 and the outer member 3010, on an axial exterior to the first aperture end 10'*a* of hinged outer member 3010', in a groove 141 formed on the outer surface of the first inner shaft axial piece 132. The length and radius of the first inner shaft axial piece 132 ($L_{FISAP}$, $R_{FISAP}$) or can be sized to fit around the first torque member 3012*a* to provide an interference fit therebetween. The length and radius of the first torque member 3012*a* can be sized to fit around the inner member 3004 to provide an interference fit therebetween. The outer member 3010 may be coupled with the hinged outer member 3010' via a tongue and groove system to form the assembly 3002. When a first circumferential directional torque may be applied, the outer circumferential surfaces of the outer shaft 130, the inner member 3004, and at least one of the first inner shaft axial piece 132 or the second inner shaft axial piece 134 may be concentric, allowing the inner member 3004 to rotate in a first circumferential direction because the pin 338 will engage the outer shaft 130 to push it to maintain concentricity. When a second circumferential directional torque may be applied, the at least one of the first inner shaft axial piece 132 or the second inner shaft axial piece 334, the outer shaft 138 lose concentricity as the pin 138 is moved within the groove 137, and at least one of the first inner shaft axial piece 332 or the second inner shaft axial piece 334 pinches against the inner bore of the control collar 130 pushing the control collar 130 out of alignment or concentricity and consequently impedes or prevents rotation, and the inner member 3004 can only rotate in the slip interface provided between the outer shaft 130 and the second torque member 3012*b* after torque applied exceeds the frictional forces of the second torque member 3012*b* within the outer member 3010. In this way, a first torque member 3012*a* having plurality of adjacent shafts 132, 134, 130, disposed between the inner member 3004 and the outer member 30010, and a second torque member 3012*b* may be provided where upon rotation in a first circumferential direction, the first torque member 3012*a* may be allowed to generally freely rotate and in a second circumferential direction, the first torque member 3012*a* may be radially shifted to impede or prevent rotation, and wherein the second torque member 3012*b* provides a circumferential slip interface between the inner member 3004 and the outer member 3010 to allow rotation in the second circumferential direction.

Figure 4:
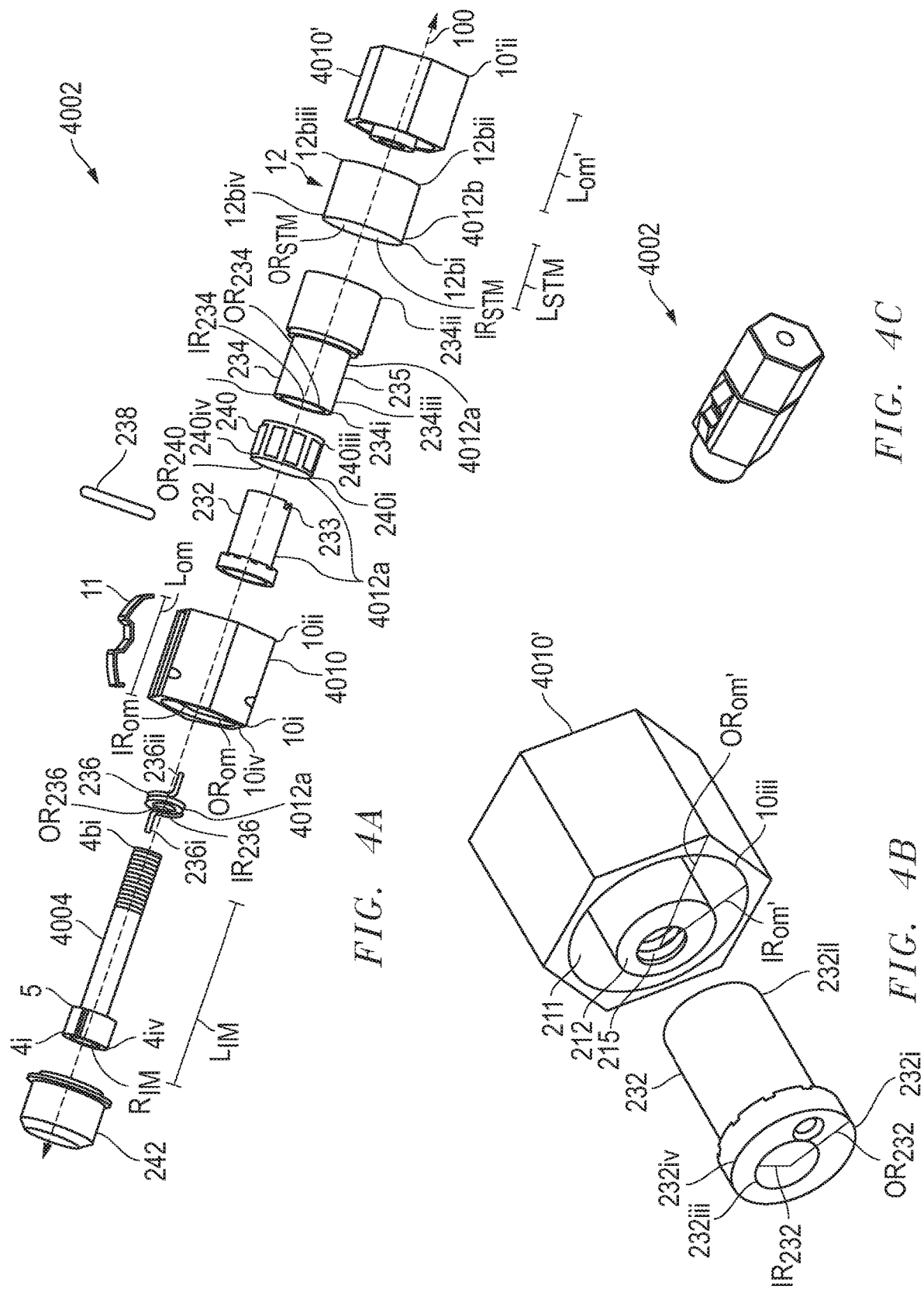
FIG. 4A is an exploded view of a torque assembly according to at least one embodiment of the invention.
FIG. 4B is an exploded view of components of a torque assembly according to at least one embodiment of the invention.
FIG. 4C is an perspective side view of a torque assembly according to at least one embodiment of the invention.

In an alternative embodiment, as shown in FIGS. 4A-4B, a torque assembly 4002 is shown. The torque assembly 4002 may include an inner member 4004 that extends along a longitudinal direction of the torque assembly 4002. As shown in FIG. 4A, the inner member may have a flange 5. The torque assembly 4002 can further include a fixed outer member or housing 4010 including a housing or similar component positioned along a central axis 100 that extends along a longitudinal direction of the torque assembly 4002. The fixed outer member 4010 may include a retention clip 11 adapted to couple the fixed housing to other components of the torque assembly 2. The outer member 4010 may include a modified outer member in the form of an eccentric outer member or housing 4010' positioned along a central axis 100 that extends along a longitudinal direction of the torque assembly 4002. The modified outer member 4010' may have a first axial end 4010'*i* and a second axial end 4010'*ii*. The modified outer member 4010' may have an inner radial end 10'*iii* and an outer radial end 10'*iv*. The modified outer member 3010' may have an inner radius $R_{OM'}$ from the central axis 100 to the inner radial end 10'*iii*. The modified outer member 4010' may have an outer radius $OR_{OM'}$ from the central axis 100 to the outer radial end 10'*iv*. The modified outer member 4010' may have a length $L_{OM'}$ from the first axial end 10'*i* to the second axial end 10'*ii*. The modified outer member 4010' may include a circumferential ingress in the form of a circumferential valley 211 along its radial length. The circumferential valley 211 *a* may have a circular, polygonal, oval, or semi-circular cross-sectional shape, or a combination of shapes. The circumferential valley may form a center plateau 213, located at the radial center of the eccentric outer member 4010'. The eccentric outer member 10' may include an offset centerline aperture 215 relative to the central axis 100. In at least one embodiment, the torque assembly 4002 can include at least one torque member or similar component 12. In at least one embodiment, the torque assembly 4002 can include a first torque member 12a and a second torque member 12b.

The first torque member 12a may include a plurality of adjacent shafts. The first torque member 4012a can include a first inner shaft axial piece including an eccentric core 232, a second inner shaft axial piece 234, and first spring component 236 and a second spring component 240. The first spring component 236 may be a torsion spring. The first spring component 236 may be disposed between the inner member 4004 and at least one of first inner shaft axial piece 232 and the second inner shaft axial piece 234 in the radial direction and be adapted to shift at least one of the first inner shaft axial piece 232, the second inner shaft axial piece 234, or the eccentric outer member 4010' in the radial direction. Such a shift may impede or prevent the first torque member 4012a from rotating in at least one of the first circumferential direction or second circumferential direction. In this embodiment, the second spring component 240 may be a tolerance ring 20. The second spring component 240 may be disposed between the first inner shaft axial piece 232 and the second inner shaft axial piece 234 in the axial direction and be adapted to shift at least one of the first inner shaft axial piece 232, the second inner shaft axial piece 234 in the radial direction. Such a shift may impede or prevent the first torque member 4012a from rotating in at least one of the first circumferential direction or second circumferential direction. The first inner shaft axial piece 232 and the second inner shaft axial piece 234 may each have a coupling flange 233, 235 respectively directed in the radial direction. These coupling flanges 233, 235 may be adapted to form a coupling between the first inner shaft axial piece 232 and the second inner shaft axial piece 234. They may form a coupling between the first inner shaft axial piece 232 and the second inner shaft axial piece 234 around the spring component 236. The first inner shaft axial piece 232 may be an eccentric core 232 that shares or opposes the offset centerline aperture relative to the eccentric outer member 4010'. This offset centerline may be adapted to shift at least one of the first inner shaft axial piece 232 or the eccentric outer member 4010' in the radial direction. Such a shift may impede or prevent the first torque member 4012a from rotating in at least one of the first circumferential direction or second circumferential direction. The second inner shaft axial piece 234 may include a first coupling flange 235 and a second coupling flange 237. The first coupling flange 235 may be radially exterior to the coupling flange 233 of the first inner shaft axial piece 232 while the second coupling flange 237 may be radially interior inner radial end 4010'iii of the eccentric outer member 4010' in the circumferential valley 211, when assembled. A pin 238 may be used to hold the axial position of at least one of the fixed outer member 4010 or the eccentric outer member 4010' relative to at least one of the first inner shaft axial piece 232 or the second inner shaft axial piece 234. The pin 238 may be used to hold the axial position of the eccentric outer member 4010' relative to at least one of the first inner shaft axial piece 232 or the second inner shaft axial piece 234. The second torque member 4012b may be a bearing or a tolerance ring. The second torque member 12b may be along the same radial plane as the first torque member 12a, but axially shifted along the central axis 100. The second torque member 12b may be along the same radial plane as the first torque member 12a, but axially shifted along the central axis 100.

In an embodiment of a torque assembly 4002, as shown in FIGS. 4A-4B, the length and radius of at least one of the outer member 4010 or the eccentric outer member 4010' can be sized to fit around the second torque member 4012b to provide an interference fit therebetween. The length and radius of the second torque member 4012b can be sized to fit around at least a portion the second inner shaft axial piece 234 to provide an interference fit therebetween. The length and radius of the second spring component 240 can be sized to fit around at least a portion the second inner shaft axial piece 234 to provide an interference fit therebetween. The length and radius of the second inner shaft axial piece 234 ($L_{SISAP}$, $R_{SISAP}$) can be sized to fit around at least a portion the first spring component 236 to provide an interference fit therebetween. The length and radius of the first spring component 236 can be sized to fit around the inner member 4004 to provide an interference fit therebetween. The outer member 4010 may be coupled with the eccentric outer member 4010' and an end cap 242 to form the assembly 4002. The end cap 242 may cover the inner member 4004 at a first axial end 4a. The pin 238 and may fit between at least one of the first inner shaft axial piece 232 or the second inner shaft axial piece 234 and the eccentric outer member 4010'. A retention clip 11 may be coupled to the outer member 4010. When a first circumferential directional torque may be applied, the inner member 4004 may be fixed to the eccentric outer member 4010' and may freely spin with the first inner shaft axial piece 232 of the first torque member 4012a because friction between the inner member 4004 and the second spring component 240 may be less than the friction between the first torque member 4012a and the second torque member 4012b because the first spring component 236 keeps the first inner shaft axial piece 232, the eccentric outer member 4010' and the inner member 4004 in concentric alignment within the outer member 4010. When a second circumferential directional torque may be applied, the inner member 4004 may be impeded or locked because the first inner shaft axial piece 232 acts with the first spring component 236 to impede or prevent rotation due to a lack of concentricity in the shafts of at least one of the inner member 4004, the first inner shaft axial piece 232, and the eccentric outer member 4010', and the inner member 4004 can only rotate in the slip interface provided between the eccentric outer member 4010' and the second torque member 4012b after torque applied exceeds the frictional forces of the second torque member 4012b within the outer member 4010. In this way, a first torque member 4012a having plurality of adjacent shafts 232, 234, 240, disposed between the inner member 4004 and the outer member 4010, and a second torque member 4012b may be provided where upon rotation in a first circumferential direction, the first torque member 4012a may be allowed to generally freely rotate and in a second circumferential direction, the first torque member 4012a may be radially shifted to impede or prevent rotation, and wherein the second torque member 4012b provides a circumferential slip interface between the inner member 4004 and the outer member 4010 to allow rotation in the second circumferential direction.

Figure 5:
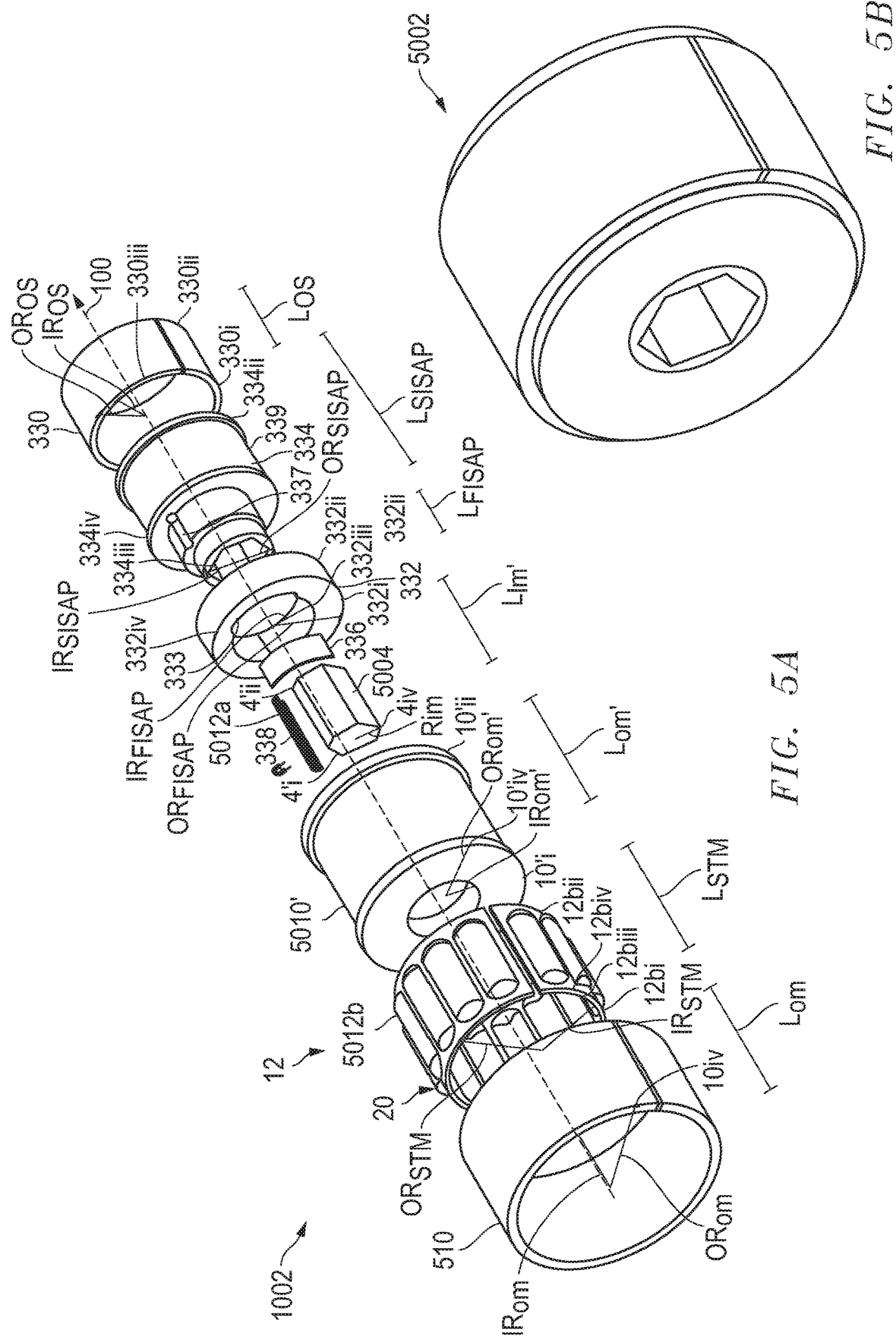
FIG. 5A is an exploded view of a torque assembly according to at least one embodiment of the invention.
FIG. 5B is an perspective side view of a torque assembly according to at least one embodiment of the invention.

In an alternative embodiment, as shown in FIGS. 5A-5B, a torque assembly 5002 is shown. The torque assembly 5002 may include an inner member 5004 that extends along a longitudinal direction of the torque assembly 5002. The torque assembly 5002 can further include a fixed outer member or housing 5010 including a housing or similar component positioned along a central axis 100 that extends along a longitudinal direction of the torque assembly 5002. The outer member 5010 may include a modified outer member in the form of a grooved outer member or housing 5010' positioned along a central axis 100 that extends along a longitudinal direction of the torque assembly 5002. The modified outer member 5010' may have a first axial end 10'*i* and a second axial end 10'*ii*. The modified outer member 5010' may have an inner radial end 10'*iii* and an outer radial end 10'*iv*. The modified outer member 5010' may have an inner radius $IR_{OM'}$, from the central axis 100 to the inner radial end 10'*iii*. The modified outer member 5010' may have an outer radius $OR_{OM'}$, from the central axis 100 to the outer radial end 10'*iv*. The modified outer member 5010' may have a length $L_{OM'}$ from the first axial end 10'*i* to the second axial end 10'*ii*. In at least one embodiment, the torque assembly 5002 can include at least one torque member or similar component 12. In at least one embodiment, the torque assembly 5002 can include a first torque member 12*a* and a second torque member 12*b*.

The first torque member 12*a* may include a plurality of adjacent shafts. The first torque member 5012*a* can include an outer shaft or bearing 330, a first inner shaft axial piece 332, a second inner shaft axial piece 334, and a spring component 336. The outer shaft or bearing 330 may be a tolerance ring or bearing. The first inner shaft axial piece 332 may be a ring including a circumferential groove 333 along its inner radius in a circumferential direction. The second inner shaft axial piece 334 may include a coupling flange 335 adapted to fit inside the ring of the first inner shaft axial piece 332. The spring component 336 may be disposed between the second inner shaft axial piece 334 and the first inner shaft axial piece 332 in the circumferential groove 333 and be adapted to shift at least one of the first inner shaft axial piece 332, the second inner shaft axial piece 334, or the outer shaft 330 in the radial direction. Such a shift may impede or prevent the first torque member 12*a* from rotating in at least one of the first circumferential direction or second circumferential direction. A pin 338 may be used to hold the axial position of the second inner shaft axial piece 334 relative to the first inner shaft axial piece 332. The pin 338 may sit within an axial groove 337 in the second inner shaft axial piece 334. The second inner shaft axial piece 234 may further include a radial groove 339 in its radial outer surface. The outer shaft or bearing 330 may fit within the radial groove 339 of the second inner shaft axial piece 234. The second torque member 5012*b* may be a bearing or a tolerance ring.

In an embodiment of a torque assembly 5002, as shown in FIG. 5A-5B, the length and radius of the outer member 5010 can be sized to fit around the second torque member 5012*b* to provide an interference fit therebetween. The length and radius of the second torque member 5012*b* can be sized to fit around the grooved outer member 5010' to provide an interference fit therebetween. The length and radius of the grooved outer member 5010' can be sized to fit around the outer shaft or bearing 330 to provide an interference fit therebetween. The length and radius of the outer shaft or bearing 330 ($L_{OS}$, $R_{OS}$) can be sized to fit around at least one of the first inner shaft axial piece 332 or the second inner shaft axial piece 334 to provide an interference fit therebetween. The length and radius of at least one of the first inner shaft axial piece 332 ($L_{FISAP}$, $R_{FISAP}$) or the second inner shaft axial piece 334 ($L_{SISAP}$, $R_{SISAP}$) can be sized to fit around the inner member 5004 to provide an interference fit therebetween to form the assembly 5002. The pin 338 and the spring component 336 may fit between at least one of the first inner shaft axial piece 332 or the second inner shaft axial piece 334 and the inner member 5004. The pin 338 may support or bias the spring component 336 and acts to prevent the second inner shaft axial piece 334 from counter-rotating. When a first circumferential directional torque may be applied, the outer circumferential surfaces of the grooved outer member 5010', the inner member 5004, the outer shaft or bearing 330, and at least one of the first inner shaft axial piece 332 or the second inner shaft axial piece 334 may be concentric, allowing the inner member 5004 to rotate in a first circumferential direction because the pin 338 will engage at least one of the first inner shaft axial piece 332 or the second inner shaft axial piece 334 to push it to maintain concentricity. When a second circumferential directional torque may be applied, the at least one of the first inner shaft axial piece 332 or the second inner shaft axial piece 334 and the pin 338 lose concentricity and at least one of the first inner shaft axial piece 332 or the second inner shaft axial piece 334 pinches against the inner bore of the grooved outer member 5010' impeding or preventing the inner member 5004 from rotating due to a lack of concentricity in the shafts of at least one of the inner member 5004, the first inner shaft axial piece 332, the second inner shaft axial piece 334, and the grooved outer member 5010', and the inner member 5004 can only rotate in the slip interface provided between the grooved outer member 5010' and the second torque member 5012*b* after torque applied exceeds the frictional forces of the second torque member 5012*b* within the outer member 5010. The spring component 336 ensures the first torque member 5012*a* touches the inner bore of the grooved outer member 10', thus ensuring immediate engagement so a second slip interface occurs between the second torque member 5012*b* and the outer member 5010. In this way, a first torque member 5012*a* having plurality of adjacent shafts 2332, 334, 330, 5010' disposed between the inner member 5004 and the outer member 5010, and a second torque member 5012*b* may be provided where upon rotation in a first circumferential direction, the first torque member 5012*a* may be allowed to generally freely rotate and in a second circumferential direction, the first torque member 5012*a* may be radially shifted to impede or prevent rotation, and wherein the second torque member 5012*b* provides a circumferential slip interface between the inner member 5004 and the outer member 5010 to allow rotation in the second circumferential direction.

As stated above, in a number of embodiments, at least one of the first torque member 12*a* or the second torque member 12*b* can include a tolerance ring 20. The tolerance ring 20 can comprise at least one annular band 122. In at least one embodiment, the annular band 122 may include projections (or "waves structures") 124 that extend radially therefrom. The second torque member 12*b* may include a tolerance ring 20 including an annular band 122 formed of a substrate 1119 and a low friction layer 1104 formed on that substrate, as discussed in detail below. The projections 124 can be formed into a flat strip, which may be subsequently formed into the curved annular band 122. In at least one embodiment, the projections 124 can be deformable or adapted to deform in the radial direction via compression when placed between different components of the torque assembly 2. In at least one embodiment, at least some of the projections 124 can radially inward. In at least one embodiment, at least some of the projections 124 can radially outward. In at least one embodiment, at least some of the projections 124 can extend in the same direction. In at least one embodiment, the projections 124 may form apexes 126 sloped radially outward from the annular band 22. In a non-illustrated embodiment, the projections 124 have staggered heights relative to one another. In a more particular embodiment, alternating projections can have alternating radial heights $R_{TH}$. In another more particular embodiment, at least three of the projections can have a first radial height and the remaining projections can have a second radial height different than the first radial height. The tolerance ring 20 can be monolithically formed from a single piece of material. The projections 24 can be stamped or otherwise formed in the piece of material. The tolerance ring 20 can then be rolled to a cylindrical, or generally cylindrical, shape, with the projections 24 extending radially inward or radially outward as desired. By way of a non-limiting example, the tolerance ring 20 can include at least 3 projections 24 extending radially from the annular 22, such as at least 4 projections, at least 5 projections, at least 6 projections, at least 7 projections, at least 8 projections, at least 9 projections, or even at least 10 projections. The projections 24 can be evenly spaced apart in a circumferential direction around the tolerance ring 20. In a non-illustrated embodiment, each projection can include a plurality of projections extending in an axial direction. That is, each projection can include a plurality of smaller projections at least partially occupying a similar footprint as the previously described projection. In at least one embodiment, the tolerance ring 20 can be formed as a split ring, i.e., the tolerance ring 20 includes an axially extending gap. At least one of the projections 24 can have a radial stiffness of less than 5000 N/mm, such as less than 4000 N/mm, such as less than 3000 N/m, such as less than 2000 N/m. At least one of the projections 24 can have a radial stiffness of less than 1000 N/mm, such as less than 750 N/mm, less than 500 N/mm, less than 250 N/mm, less than 200 N/mm, less than 150 N/mm, less than 100 N/mm, less than 50 N/mm, less than 25 N/mm, less than 10 N/mm, less than 5 N/mm, less than 4 N/mm, less than 3 N/mm, less than 2 N/mm, or even less than 1 N/mm. The radial stiffness can be greater than 0 N/mm.

In a number of embodiments, at least one of the first torque member 12a or the second torque member 12b can include a bearing. The bearing may be a plain bearing, a rolling-element bearing, a jewel bearing, a journal bearing, a sliding bearing, a fluid bearing, a magnetic bearing, a flexure bearing, or may be another type.

It will be appreciated that the torque assembly 2 may include or may be described as having any of the characteristics of the other torque assemblies 2002, 3002, 4002, or 5002 shown in the various embodiments above. It will be appreciated that the inner member 4 may include or be described as having any of the characteristics of the other inner members 2004, 3004, 4004, and 5004 shown in the various embodiments above. It will be appreciated that the outer member 10 may include or be described as having any of the characteristics of the other outer members 2010, 3010, 4010, and 5010 shown in the various embodiments above. It will be appreciated that the first torque member 12a may include or be described as having any of the characteristics of the other outer members 2012a, 3012a, 4012a, and 5012a shown in the various embodiments above. It will be appreciated that the second torque member 12b may include or be described as having any of the characteristics of the other outer members 2012b, 3012b, 4012b, and 5012b shown in the various embodiments above. It can be further appreciated that in any of the embodiments above, the first torque member 12a, 2012a, 3012a, 4012a, and 5012a (including any of its components) may be allowed to generally freely rotate in a first circumferential direction and radially shifted to impede or prevent rotation in a second circumferential direction about the central axis 100. It can be further appreciated that in any of the embodiments above, the inner member 4, 2004, 3004, 4004, 5004 may rotate with the first torque member 12a, 2012a, 3012a, 4012a, and 5012a (including any of its components) through an engagement between the inner member 4, 2004, 3004, 4004, 5004 and the first torque member 12a, 2012a, 3012a, 4012a, and 5012a (including any of its components). In at least one embodiment, the outer member 10, 2010, 3010, 4010, 5010, 3010', 4010', 5010' (including any of its components) may rotate with the first torque member 12a, 2012a, 3012a, 4012a, and 5012a (including any of its components) through an engagement between the outer member 10, 2010, 3010, 4010, 5010, 3010', 4010', 5010' (including any of its components) and the first torque member 12a, 2012a, 3012a, 4012a, and 5012a (including any of its components). The second torque member 12b, 2012b, 3012b, 4012b, and 5012b (including any of its components) may provide a circumferential slip interface between the inner member 4, 2004, 3004, 4004, 5004 (or a component therebetween) and the outer member 10, 2010, 3010, 4010, 5010, 3010', 4010', 5010' (including any of its components) to allow rotation in the second circumferential direction. In at least one embodiment, the inner member 4, 2004, 3004, 4004, 5004 may rotate with the second torque member 12b, 2012b, 3012b, 4012b, and 5012b (including any of its components) through an engagement between the inner member 4, 2004, 3004, 4004, 5004 and the second torque member 12b, 2012b, 3012b, 4012b, and 5012b (including any of its components). In at least one embodiment, the outer member 10, 2010, 3010, 4010, 5010, 3010', 4010', 5010' (including any of its components) may rotate with the second torque member 12b, 2012b, 3012b, 4012b, and 5012b (including any of its components) through an engagement between the outer member 10, 2010, 3010, 4010, 5010, 3010', 4010', 5010' (including any of its components) and the second torque member 12b, 2012b, 3012b, 4012b, and 5012b (including any of its components).

In a number of embodiments, the inner member 4 (labeled also as 2004, 3004, 4004, and 5004 in various embodiments above) may be rigid. The inner member 4 may be solid. The inner member 4 may be made of a material conventional in the art such as, but not limited to, a metal or metal alloy, a ceramic, a polymer, or a composite material. The inner member 4 can at least partially include a metal which may include aluminum, zinc, copper, magnesium, tin, platinum, titanium, tungsten, iron, manganese, nickel, vanadium, zinc, bronze, alloys thereof, any combination thereof, or may be another type. More particularly, inner member 4 can at least partially include a steel, such as a stainless steel or spring steel. For example, the inner member 4 can at least partially include a 301 stainless steel. The 301 stainless steel may be annealed, ¼ hard, ½ hard, ¾ hard, or full hard. The inner member 4 may be a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, elastomers (including but not limited to, rubber, or silicone based elastomers), thermoset materials, or any combination thereof. In an example, the inner member 4 can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the inner member 4 includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the inner member 4 includes polyketone, such as polyether ether ketone (PEEK), polyether ketone, polyether ketone ketone, polyether ketone ether ketone, a derivative thereof, or a combination thereof. In an additional example, the inner member 4 may be an ultra high molecular weight polyethylene. In a specific example, the inner member 4 can include a fluoropolymer. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. The inner member 4 can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The inner member 4 may be formed and manufactured according to known techniques in the bearing arts. The inner member 4 may have a circular, polygonal, oval, or semi-circular cross-sectional shape, or a combination of shapes. The inner member 4 may have a radius $R_{IM}$, from the central axis 100 to the outer radial end 4$iv$, and $R_{IM}$ can be ≥0.5 mm, such as ≥1 mm, ≥5 mm, ≥10 mm, ≥15 mm, or ≥20 mm. The $R_{IM}$ can be ≤45 mm, such as ≤40 mm, such as ≤35 mm, such as ≤30 mm, ≤20 mm, ≤15 mm, ≤10 mm, or ≤5 mm. The inner member 4 can have a length $L_{IM}$ from first axial end 4$i$ to the second axial end 4$ii$, and $L_{IM}$ can be ≥0.5 mm, ≥0.75 mm, ≥1 mm, ≥2 mm, ≥5 mm, or ≥10 mm. $L_{IM}$ can be ≤10 mm, such as ≤7.5 mm, ≤5 mm, ≤2.5 mm, or ≤1 mm. It will be appreciated that at least one of the length $L_{OM}$ or the radius $R_{IM}$ may be within a range between any of the values noted above. It will be further appreciated that at least one of the length $L_{IM}$ or the radius $R_{IM}$ may be any value between any of the values noted above.

In a number of embodiments, the outer member 10 (labeled also as 2010, 3010, 4010, and 5010 in various embodiments above) may be rigid. The outer member 10 may be solid. The outer member 10 may be made of a material conventional in the art such as, but not limited to, a metal or metal alloy, a ceramic, a polymer, or a composite material. The outer member 10 can at least partially include a metal which may include aluminum, zinc, copper, magnesium, tin, platinum, titanium, tungsten, iron, manganese, nickel, vanadium, zinc, bronze, alloys thereof, any combination thereof, or may be another type. More particularly, outer member 10 can at least partially include a steel, such as a stainless steel or spring steel. For example, the outer member 10 can at least partially include a 301 stainless steel. The 301 stainless steel may be annealed, ¼ hard, ½ hard, ¾ hard, or full hard. The outer member 10 may be a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, elastomers (including but not limited to, rubber, or silicone based elastomers), thermoset materials, or any combination thereof. In an example, the outer member 10 can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the outer member 10 includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the outer member 10 includes polyketone, such as polyether ether ketone (PEEK), polyether ketone, polyether ketone ketone, polyether ketone ether ketone, a derivative thereof, or a combination thereof. In an additional example, the outer member 10 may be an ultra high molecular weight polyethylene. In a specific example, the outer member 10 can include a fluoropolymer. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. The outer member 10 can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The outer member 10 may be formed and manufactured according to known techniques in the bearing arts. The outer member 10 may have a circular, polygonal, oval, or semi-circular cross-sectional shape, or a combination of shapes. The outer member 10 may have an outer radius $OR_{OM}$, from the central axis 100 to the outer radial end 10$iv$, and $OR_{OM}$ can be ≥0.5 mm, such as ≥1 mm, ≥5 mm, ≥10 mm, ≥15 mm, or ≥20 mm. The $OR_{OM}$ can be ≤45 mm, such as ≤40 mm, such as ≤35 mm, such as ≤30 mm, ≤20 mm, ≤15 mm, ≤10 mm, or ≤5 mm. The outer member 10 may have an inner radius $IR_{OM}$, from the central axis 100 to the inner radial end 10$iii$, and $IR_{OM}$ can be ≥1 mm, such as ≥5 mm, ≥7.5 mm, ≥10 mm, ≥15 mm, or ≥20 mm. The $IR_{OM}$ can be ≤20 mm, such as ≤15 mm, ≤10 mm, ≤7.5 mm, ≤5 mm, or ≤1 mm. The outer member 10 can have a length $L_{OM}$ from first axial end 10$i$ to the second axial end 10$ii$, and $L_{OM}$ can be ≥0.5 mm, ≥0.75 mm, ≥1 mm, ≥2 mm, ≥5 mm, or ≥10 mm. $L_{OM}$ can be ≤10 mm, such as ≤7.5 mm, ≤5 mm, ≤2.5 mm, or ≤1 mm. The modified outer member 10' may have an outer radius $OR_{OM'}$, from the central axis 100 to the outer radial end 10'$iv$, and $OR_{OM'}$ can be ≥0.5 mm, such as ≥1 mm, ≥5 mm, ≥10 mm, ≥15 mm, or ≥20 mm. The $OR_{OM'}$ can be ≤45 mm, such as ≤40 mm, such as ≤35 mm, such as ≤30 mm, ≤20 mm, ≤15 mm, ≤10 mm, or ≤5 mm. The modified outer member 10' may have an inner radius $R_{OM'}$, from the central axis 100 to the inner radial end 10'$iii$, and $IR_{OM'}$ can be ≥1 mm, such as ≥5 mm, ≥7.5 mm, ≥10 mm, ≥15 mm, or ≥20 mm. The $R_{OM'}$ can be ≤20 mm, such as ≤15 mm, ≤10 mm, ≤7.5 mm, ≤5 mm, or ≤1 mm. The modified outer member 10' can have a length $L_{OM'}$ from first axial end 10'$i$ to the second axial end 10'$ii$, and $L_{OM'}$ can be ≥0.5 mm, ≥0.75 mm, ≥1 mm, ≥2 mm, ≥5 mm, or ≥10 mm. $L_{OM'}$ can be ≤10 mm, such as ≤7.5 mm, ≤5 mm, ≤2.5 mm, or ≤1 mm. It will be appreciated that at least one of the outer radius $OR_{OM}$, $OR_{OM'}$, inner radius $IR_{OM}$, $IR_{OM'}$, or length $L_{OM}$, $L_{OM'}$ may be within a range between any of the values noted above. It will be further appreciated that at least one of the outer radius $OR_{OM}$, $OR_{OM'}$, inner radius $IR_{OM}$, $IR_{OM'}$, or length $L_{OM}$, $L_{OM'}$ may be any value between any of the values noted above.

In a number of embodiments, the first torque member 12a (labeled also as 2012a, 3012a, 4012a, and 5012a) (or any of its components) may be rigid. The first torque member 12a (or any of its components) may be solid. The first torque member 12a (or any of its components) may be made of a material conventional in the art such as, but not limited to, a metal or metal alloy, a ceramic, a polymer, or a composite material. The first torque member 12a (or any of its components) can at least partially include a metal which may include aluminum, zinc, copper, magnesium, tin, platinum, titanium, tungsten, iron, manganese, nickel, vanadium, zinc, bronze, alloys thereof, any combination thereof, or may be another type. More particularly, first torque member 12a (or any of its components) can at least partially include a steel, such as a stainless steel or spring steel. For example, the first torque member 12a can at least partially include a 301 stainless steel. The 301 stainless steel may be annealed, ¼ hard, ½ hard, ¾ hard, or full hard. The first torque member 12a (or any of its components) may be a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, elastomers (including but not limited to, rubber, or silicone based elastomers), thermoset materials, or any combination thereof. In an example, the first torque member 12a (or any of its components) can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the first torque member 12a includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the first torque member 12a includes polyketone, such as polyether ether ketone (PEEK), polyether ketone, polyether ketone ketone, polyether ketone ether ketone, a derivative thereof, or a combination thereof. In an additional example, the first torque member 12a may be an ultra high molecular weight polyethylene. In a specific example, the first torque member 12a can include a fluoropolymer. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. The first torque member 12a can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The first torque member 12a (or any of its components) may be formed and manufactured according to known techniques in the bearing arts. The first torque member 12a (or any of its components) may have a circular, polygonal, oval, or semi-circular cross-sectional shape, or a combination of shapes. The first torque member 12a (or any of its components including $OR_{SISAP}$, $OR_{SISAP}$, $OR_{OS}$) may have an outer radius $OR_{FTM}$, from the central axis 100 to the outer radial end 12aiv (or corresponding reference numbers as shown in FIGS. 1A-5B by original component reference number), and $OR_{FTM}$ can be ≥0.5 mm, such as ≥1 mm, ≥5 mm, ≥10 mm, ≥15 mm, or ≥20 mm. The $OR_{FTM}$ can be ≤45 mm, such as ≤40 mm, such as ≤35 mm, such as ≤30 mm, ≤20 mm, ≤15 mm, ≤10 mm, or ≤5 mm. The first torque member 12a (or any of its components including $IR_{SISAP}$, $IR_{SISAP}$, $IR_{OS}$) may have an inner radius $IR_{FTM}$, from the central axis 100 to the inner radial end 12aiii (or corresponding reference numbers as shown in FIGS. 1A-5B by original component reference number), and $IR_{FTM}$ can be ≥1 mm, such as ≥5 mm, ≥7.5 mm, ≥10 mm, ≥15 mm, or ≥20 mm. The $IR_{FTM}$ can be ≤20 mm, such as ≤15 mm, ≤10 mm, ≤7.5 mm, ≤5 mm, or ≤1 mm. The first torque member 12a (or any of its components, including $L_{SISAP}$, $L_{SISAP}$, $L_{OS}$) can have a length $L_{FTM}$ from first axial end 12ai to the second axial end 12aii (or corresponding reference numbers as shown in FIGS. 1A-5B by original component reference number), and $L_{FTM}$ can be ≥0.5 mm, ≥0.75 mm, ≥1 mm, ≥2 mm, ≥5 mm, or ≥10 mm. $L_{FTM}$ can be ≤10 mm, such as ≤7.5 mm, ≤5 mm, ≤2.5 mm, or ≤1 mm. It will be appreciated that at least one of the outer radius $OR_{FTM}$, inner radius $IR_{FTM}$, or length $L_{FTM}$ may be within a range between any of the values noted above. It will be further appreciated that at least one of the outer radius $OR_{FTM}$, inner radius $IR_{FTM}$, or length $L_{FTM}$ may be any value between any of the values noted above.

In a number of embodiments, the second torque member (labeled also as 2012b, 3012b, 4012b, and 5012b) (or any of its components) 12b may be rigid. The second torque member 12b (or any of its components) may be solid. The second torque member 12b (or any of its components) may be made of a material conventional in the art such as, but not limited to, a metal or metal alloy, a ceramic, a polymer, or a composite material. The second torque member 12b can at least partially include a metal which may include aluminum, zinc, copper, magnesium, tin, platinum, titanium, tungsten, iron, manganese, nickel, vanadium, zinc, bronze, alloys thereof, any combination thereof, or may be another type. More particularly, second torque member 12b can at least partially include a steel, such as a stainless steel or spring steel. For example, the second torque member 12b can at least partially include a 301 stainless steel. The 301 stainless steel may be annealed, ¼ hard, ½ hard, ¾ hard, or full hard. The second torque member 12b may be a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, elastomers (including but not limited to, rubber, or silicone based elastomers), thermoset materials, or any combination thereof. In an example, the second torque member 12b can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the second torque member 12b includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the second torque member 12b includes polyketone, such as polyether ether ketone (PEEK), polyether ketone, polyether ketone ketone, polyether ketone ether ketone, a derivative thereof, or a combination thereof. In an additional example, the second torque member 12b may be an ultra high molecular weight polyethylene. In a specific example, the second torque member 12b can include a fluoropolymer. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. The second torque member 12b can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The second torque member 12b may be formed and manufactured according to known techniques in the bearing arts. The second torque member 12b (or any of its components) may have a circular, polygonal, oval, or semi-circular cross-sectional shape, or a combination of shapes. The second torque member 12b (or any of its components) may have an outer radius $OR_{STM}$, from the central axis 100 to the outer radial end 12biv, and $OR_{STM}$ can be ≥0.5 mm, such as ≥1 mm, ≥5 mm, ≥10 mm, ≥15 mm, or ≥20 mm. The $OR_{STM}$ can be ≤45 mm, such as ≤40 mm, such as ≤35 mm, such as ≤30 mm, ≤20 mm, ≤15 mm, ≤10 mm, or ≤5 mm. The second torque member 12b (or any of its components) may have an inner radius $IR_{STM}$, from the central axis 100 to the inner radial end 12iii, and $IR_{STM}$ can be ≥1 mm, such as ≥5 mm, ≥7.5 mm, ≥10 mm, ≥15 mm, or ≥20 mm. The $IR_{STM}$ can be ≤20 mm, such as ≤15 mm, ≤10 mm, ≤7.5 mm, ≤5 mm, or ≤1 mm. The second torque member 12b (or any of its components) can have a length $L_{STM}$ from first axial end 12bi to the second axial end 12ii, and $L_{STM}$ can be ≥0.5 mm, ≥0.75 mm, ≥1 mm, ≥2 mm, ≥5 mm, or ≥10 mm. $L_{STM}$ can be ≤10 mm, such as ≤7.5 mm, ≤5 mm, ≤2.5 mm, or ≥1 mm. It will be appreciated that at least one of the outer radius $OR_{STM}$, inner radius $IR_{TM}$, or length $L_{STM}$ may be within a range between any of the values noted above. It will be further appreciated that least one of the outer radius $OR_{STM}$, inner radius $IR_{STM}$, or length $L_{STM}$ may be any value between any of the values noted above.

Figure 6:
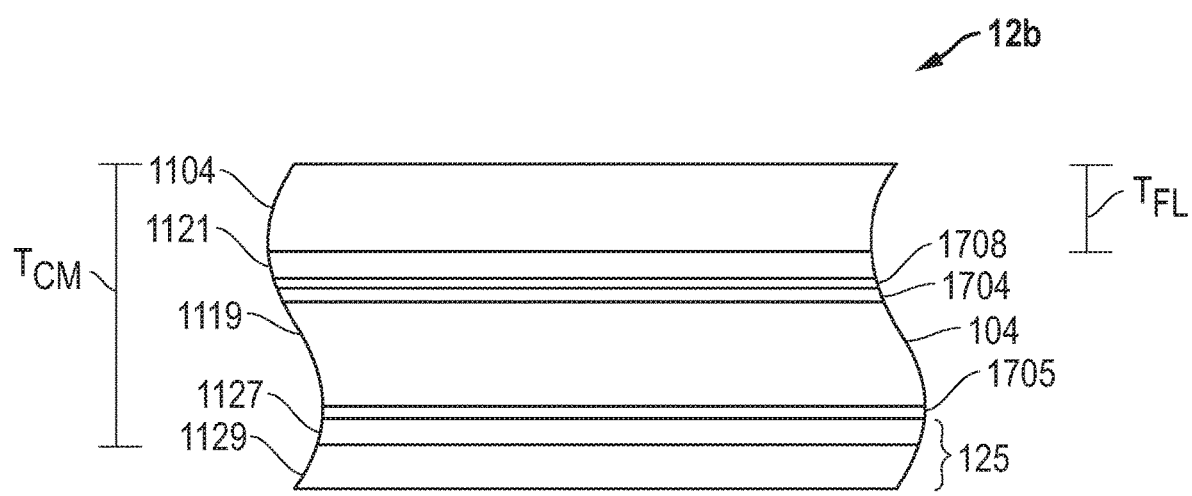
FIG. 6 is a cross-sectional view of a component of a torque assembly according to at least one embodiment of the invention.

In a number of embodiments, as shown in FIG. 6, at least one component of the first torque member 12a (labeled also as 2012a, 3012a, 4012a, and 5012a) or second torque member 12b (labeled also as 2012b, 3012b, 4012b, and 5012b) may include a substrate 1119. The substrate may include a metal strip 1119. In a number of embodiments, at least one component of the first torque member 12a or second torque member 12b may include a low friction layer 1104. The low friction layer 1104 can be coupled to at least a portion of the metal strip 1119. In a particular embodiment, the low friction layer 1104 can be coupled to a surface of the metal strip 1119 so as to form a low friction interface with another surface of another component. In a particular embodiment, the low friction layer 1104 can be coupled to the radially inner surface of the metal strip 1119 so as to form a low friction interface with another surface of another component. In a particular embodiment, the low friction layer 1104 can be coupled to the radially outer surface of the metal strip 1119 so as to form a low friction interface with another surface of another component (such as an inner member 4 or outer member 10).

The substrate or metal strip 1119 can at least partially include a metal. The metal may include aluminum, zinc, copper, magnesium, tin, platinum, titanium, tungsten, iron, manganese, nickel, vanadium, zinc, bronze, alloys thereof, or may be another type. More particularly, the substrate or metal strip 1119 can at least partially include a steel, such as a stainless steel or spring steel. For example, the substrate can at least partially include a 301 stainless steel. The 301 stainless steel may be annealed, ¼ hard, ½ hard, ¾ hard, or full hard. The metal strip 1119 may include a woven mesh or an expanded metal grid. Alternatively, the woven mesh can be a woven polymer mesh. In an alternate embodiment, the metal strip 1119 may not include a mesh or grid. In another alternate embodiment, the metal strip 1119, as a solid component, woven mesh or expanded metal grid, may be embedded between at least one adhesive layer 1121 included between the low friction layer 1104 and the metal strip 1119. In at least one embodiment, the metal strip 1119 may be any kind of metal alloy which provides an elastic behavior under application load in an arcuate shape.

Optionally, at least one component of the first torque member 12a or second torque member 12b may include at least one adhesive layer 1121 that may couple the low friction layer 1103 to the metal strip 1119. The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. The hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the metal strip 1119 may be coated with corrosion protection layers 1704 and 1705 to prevent corrosion of at least one component of the first torque member 12a or second torque member 12b prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

Optionally, at least one component of the first torque member 12a or second torque member 12b may further include a corrosion resistant coating 1125. The corrosion resistant coating 1125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

The low friction layer 1104 of at least one component of the first torque member 12a or second torque member 12b can comprise materials including, for example, a polymer, such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, manganese, nickel, vanadium, zinc, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, graphene, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In at least one embodiment, the torque assembly 2 (labeled also as 2002, 3002, 4002, 5002) may include a lubricant on any of its components. In at least one embodiment, the lubricant may include a grease including at least one of lithium soap, lithium disulfide, graphite, mineral or vegetable oil, silicone grease, fluorether-based grease, apiezon, food-grade grease, petrochemical grease, or may be a different type. In at least one embodiment, the lubricant may include an oil including at least one of a Group I-GroupIII+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based oil, or may be a different type. In at least one embodiment, the lubricant may include a solid based lubricant including at least one of lithium soap, graphite, boron nitride, molybdenum disulfide, tungsten disulfide, polytetrafluoroethylene, a metal, a metal alloy, or may be a different type.

wherein the first torque member has a first torque, $T_1$, wherein $T_1$ is the minimum torque at which the first torque member rotates in the first circumferential direction, wherein the first torque member has a second torque, $T_2$, wherein $T_2$ is the minimum torque at which the first torque member rotates in the second circumferential direction, wherein the second torque member has a third torque, $T_3$, wherein $T_3$ is the minimum torque at which the second torque member rotates in the second circumferential direction, and wherein $T_1 < T_3 < T_2$.

In a number of embodiments, the first torque member 12a (labeled also as 2012a, 3012a, 4012a, and 5012a) may have a first torque, $T_1$, where $T_1$ is the minimum torque at which the first torque member 12a rotates in the first circumferential direction. The first torque member 12a may have a second torque, $T_2$, where $T_2$ is the minimum torque at which the first torque member 12a rotates in the second circumferential direction. In a number of embodiments, the second torque member 12b (labeled also as 2012b, 3012b, 4012b, and 5012b) may have a third torque, $T_3$, where $T_3$ is the minimum torque at which the second torque member 12b rotates in the second circumferential direction. In a number of embodiments, $T_1 < T_3 < T_2$. In a number of embodiments, $2T_1 < T_2$, such as $5T_1 < T_2$, such as $10T_1 < T_2$, or such as $20T_1 < T_2$. In a number of embodiments, $5T_1 < T_3$, such as $2T_1 < T_3$, such as $2.5T_1 < T_3$, or such as $3T_1 < T_3$. In at least one embodiment, the first torque member 12a may have a minimum first torque, $T_1$, in the range of about 1 N·m to about 20 N·m. In at least one embodiment, the first torque member 12a may have a minimum second torque, $T_2$, in the range of about 1 N·m to about 20 N·m. In at least one embodiment, the second torque member 12b may have may have a minimum first torque, $T_3$ in the range of about 1 N·m to about 20 N·m.

In an embodiment, the torque assembly 2 can be installed or assembled by an assembly force of at least 1 kgf in a longitudinal direction relative to the shaft 4 or housing 8, such as at least 2 kgf, at least 3 kgf, at least 4 kgf, at least 5 kgf, at least 10 kgf, or even at least 15 kgf. In a further embodiment, the torque assembly 2 can be installed or assembled by an assembly force of no greater than 20 kg in a longitudinal direction to the housing 8, such as no greater than 19 kgf, no greater than 18 kgf, no greater than 17 kgf, or even no greater than 16 kgf.

According to various embodiments herein, torque assemblies are provided that may provide more efficiency in having differing torques in differing directions for use in vehicle applications. According to various embodiments herein, torque assemblies are provided that may provide a more stable performance of the torque assembly over the lifetime of its use. According to various embodiments herein, torque assemblies are provided that may eliminate additional parts, installation and manufacturing time, and provide easier use for torque assemblies. According to various embodiments herein, torque assemblies may be used as a drop in solution, providing minimal modifications to existing torque assemblies. According to various embodiments herein, torque assemblies may provide less wear or abrasion over a lifetime of the torque assembly. According to various embodiments herein, torque assemblies may provide improved torque performance in any of its components over a lifetime of the torque assembly.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A torque assembly comprising: an inner member; an outer member; a first torque member disposed between the inner member and the outer member; and a second torque member disposed radially exterior or interior to the first torque member; wherein upon rotation in a first circumferential direction, the first torque member is allowed to generally freely rotate and in a second circumferential direction, the first torque member is radially shifted to impede or prevent rotation, and wherein the second torque member provides a circumferential slip interface between the inner member and the outer member to allow rotation in the second circumferential direction.

Embodiment 2: A torque assembly comprising: an inner member comprising a shaft; an outer member comprising a housing; a first torque member comprising a bearing disposed between the inner member and the outer member; and a second torque member disposed radially exterior or interior to the first torque member; wherein upon rotation in a first circumferential direction, the first torque member is allowed to generally freely rotate and in a second circumferential direction, the first torque member is radially shifted to impede or prevent rotation, and wherein the second torque member provides a circumferential slip interface between the inner member and the outer member to allow rotation in the second circumferential direction.

Embodiment 3: A torque assembly comprising: an inner member comprising a shaft; an outer member comprising a housing; a first torque member comprising a plurality of adjacent shafts disposed between the inner member and the outer member; and a second torque member disposed radially exterior or interior to the first torque member; wherein upon rotation in a first circumferential direction, the first torque member is allowed to generally freely rotate and in a second circumferential direction, the first torque member is radially shifted to impede or prevent rotation, and wherein the second torque member provides a circumferential slip interface between the inner member and the outer member to allow rotation in the second circumferential direction.

Embodiment 4: The torque assembly of any of the preceding embodiments, wherein the second torque member comprises a tolerance ring.

Embodiment 5: The torque assembly of any of the preceding embodiments, wherein the second torque member comprises a plain bearing.

Embodiment 6: The torque assembly of any of the preceding embodiments, wherein the second torque member comprises an annular band formed of a substrate and a low friction layer disposed on the substrate.

Embodiment 7: The torque assembly of embodiment 6, wherein the substrate comprises a metal comprises iron, copper, titanium, tin, aluminum, magnesium, manganese, nickel, vanadium, zinc, or an alloy thereof.

Embodiment 8: The torque assembly of embodiment 6, wherein the low friction layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 9: The torque assembly of embodiment 4, wherein the tolerance ring has a plurality of projections extending in a radial direction.

Embodiment 10: The torque assembly of embodiment 2, wherein the first torque member comprises a one-way bearing.

Embodiment 11: The torque assembly of embodiment 10, wherein the first torque member comprises a needle bearing.

Embodiment 12: The torque assembly of embodiment 11, wherein the needle bearing comprises a plurality of rolling elements adapted to rotate in a first circumferential direction.

Embodiment 13: The torque assembly of embodiment 12, wherein the bearing further comprises a locking component adapt to impede or prevent the plurality of rolling elements from rotating in a second circumferential direction.

Embodiment 14: The torque assembly of embodiment 10, wherein the first torque member comprises a sprag bearing.

Embodiment 15: The torque assembly of embodiment 14, wherein the sprag bearing comprises a plurality of sliding elements adapted to rotate in a first circumferential direction.

Embodiment 16: The torque assembly of embodiment 15, wherein the bearing further comprises a locking component adapt to impede or prevent the plurality of rolling elements from rotating in a second circumferential direction.

Embodiment 17: The torque assembly of embodiment 3, wherein the first torque member comprises an outer shaft, a first inner shaft axial piece, a second inner shaft axial piece, and a spring component.

Embodiment 18: The torque assembly of embodiment 17, wherein the outer shaft is disposed radially exterior to the first inner shaft axial piece, the second inner shaft axial piece, and the spring component, and radially interior the second torque member.

Embodiment 19: The torque assembly of embodiment 17, wherein the spring component is disposed between the first inner shaft axial piece and the second inner shaft axial piece in the axial direction and adapted to shift at least one of the first inner shaft axial piece, second inner shaft axial piece, or outer shaft in the radial direction.

Embodiment 20: The torque assembly of any of the preceding embodiments, wherein the first inner shaft axial piece and the second inner shaft axial piece each have a coupling flange in the radial direction adapted to form a coupling between the first inner shaft axial piece and the second inner shaft axial piece.

Embodiment 21: The torque assembly of any of the preceding embodiments, wherein the second torque member is disposed radially exterior to the first torque member.

Embodiment 22: The torque assembly of any of the preceding embodiments, wherein the second torque member is disposed radially interior the first torque member.

Embodiment 23: The torque assembly of any of the preceding embodiments, wherein the first torque member has a first torque, $T_1$, wherein $T_1$ is the minimum torque at which the first torque member rotates in the first circumferential direction, wherein the first torque member has a second torque, $T_2$, wherein $T_2$ is the minimum torque at which the first torque member rotates in the second circumferential direction, wherein the second torque member has a third torque, $T_3$, wherein $T_3$ is the minimum torque at which the second torque member rotates in the second circumferential direction, and wherein $T_1<T_3<T_2$.

Embodiment 24: The torque assembly of embodiment 23, wherein $2T_1<T_2$, such as $5T_1<T_2$, such as $10T_1<T_2$, or such as $20T_1<T_2$.

Embodiment 25: The torque assembly of embodiment 23, wherein $1.5T_1<T_3$, such as $2T_1<T_3$, such as $2.5T_1<T_3$, or such as $3T_1<T_3$.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A torque assembly comprising:
an inner member;
an outer member;
a first torque member disposed between the inner member and the outer member; and
a second torque member disposed radially exterior to the first torque member; wherein upon rotation in a first circumferential direction, the first torque member is allowed to generally freely rotate and in a second circumferential direction, the first torque member is radially shifted to impede or prevent rotation, and wherein the second torque member provides a circumferential slip interface between the inner member and the outer member to allow rotation in the second circumferential direction, wherein the first torque member has a first torque, $T_1$, wherein $T_1$ is the minimum torque at which the first torque member rotates in the first circumferential direction, wherein the first torque member has a second torque, $T_2$, wherein $T_2$ is the minimum torque at which the first torque member rotates in the second circumferential direction, wherein the second torque member has a third torque, $T_3$, wherein $T_3$ is the minimum torque at which the second torque member rotates in the second circumferential direction, and wherein $T_1 < T_3 < T_2$.

2. A torque assembly comprising:
an inner member comprising a shaft;
an outer member comprising a housing;
a first torque member comprising a bearing disposed between the inner member and the outer member; and
a second torque member disposed radially exterior to the first torque member; wherein upon rotation in a first circumferential direction, the first torque member is allowed to generally freely rotate and in a second circumferential direction, the first torque member is radially shifted to impede or prevent rotation, and wherein the second torque member provides a circumferential slip interface between the inner member and the outer member to allow rotation in the second circumferential direction, wherein the first torque member has a first torque, $T_1$, wherein $T_1$ is the minimum torque at which the first torque member rotates in the first circumferential direction, wherein the first torque member has a second torque, $T_2$, wherein $T_2$ is the minimum torque at which the first torque member rotates in the second circumferential direction, wherein the second torque member has a third torque, $T_3$, wherein $T_3$ is the minimum torque at which the second torque member rotates in the second circumferential direction, and wherein $T_1 < T_3 < T_2$.

3. The torque assembly of claim 1, wherein the second torque member comprises a tolerance ring.

4. The torque assembly of claim 1, wherein the second torque member comprises a plain bearing.

5. The torque assembly of claim 1, wherein the second torque member comprises an annular band formed of a substrate and a low friction layer disposed on the substrate.

6. The torque assembly of claim 5, wherein the substrate comprises a metal comprises iron, copper, titanium, tin, aluminum, magnesium, manganese, nickel, vanadium, zinc, or an alloy thereof.

7. The torque assembly of claim 5, wherein the low friction layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

8. The torque assembly of claim 3, wherein the tolerance ring has a plurality of projections extending in a radial direction.

9. The torque assembly of claim 2, wherein the first torque member comprises a one-way bearing.

10. The torque assembly of claim 9, wherein the first torque member comprises a needle bearing.

11. The torque assembly of claim 10, wherein the bearing further comprises a locking component adapt to impede or prevent the plurality of rolling elements from rotating in a second circumferential direction.

12. The torque assembly of claim 9, wherein the first torque member comprises a sprag bearing.

13. The torque assembly of claim 1, wherein the second torque member is disposed radially exterior the first torque member.

14. The torque assembly of claim 1, wherein the second torque member is disposed radially interior the first torque member.

* * * * *